United States Patent
Nourrcier

Patent Number: 5,151,747
Date of Patent: Sep. 29, 1992

[54] LASER RADAR WIRE DETECTION

[75] Inventor: Charles E. Nourrcier, Lakewood, Calif.

[73] Assignee: Hughes Aircraft Company, Los Angeles, Calif.

[21] Appl. No.: 774,914

[22] Filed: Oct. 11, 1991

[51] Int. Cl.⁵ .................................................. G01C 3/08
[52] U.S. Cl. .......................................... 356/5; 356/28.5
[58] Field of Search ............................. 356/5, 4.5, 28.5

[56] References Cited

U.S. PATENT DOCUMENTS

| | | | |
|---|---|---|---|
| 4,167,329 | 9/1979 | Jelalian et al. | 356/5 |
| 4,572,662 | 2/1986 | Silverman | 356/5 |
| 4,666,295 | 5/1987 | Duvall, III et al. | 356/5 |
| 4,721,385 | 1/1988 | Jelalian et al. | 356/5 |
| 4,846,571 | 7/1989 | Jelalian et al. | 356/5 |
| 4,902,126 | 2/1990 | Koechner | 356/5 |

Primary Examiner—Mark Hellner
Attorney, Agent, or Firm—William J. Streeter; G. S. Grunebach; W. K. Denson-Low

[57] ABSTRACT

A laser radar detection system (10) is provided for detecting targets located within a detection field and discriminating between unresolved and resolved detected objects (32,34). The detection system (10) employs a laser radar sensor (12) for transmitting a frequency modulated optical transmit signal (22) which scans a desires field and receiving a return signal (24) from objects located therein. The laser radar sensor (12) includes a photo mixer (20) for providing the difference between the return signal (24) and a local oscillator (LO) signal (26) derived from the transmit signal (22). A processor (14) is employed for receiving the difference signal and provides a fourier transform thereof to thereby provide a power spectrum in the frequency domain. The processor (14) analyzes the power spectrum to determine whether the transformed signal contains side lobes (40) and is therefore clutter or does not contain side lobes (40) and therefore indicates the detection of an unresolved object (32).

13 Claims, 6 Drawing Sheets

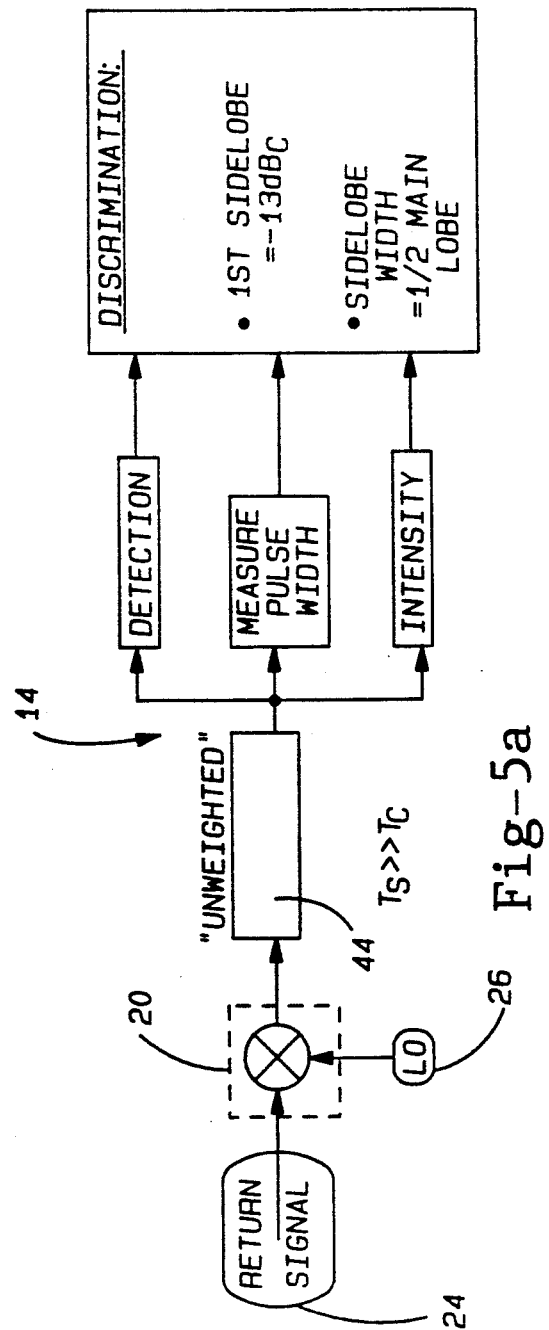
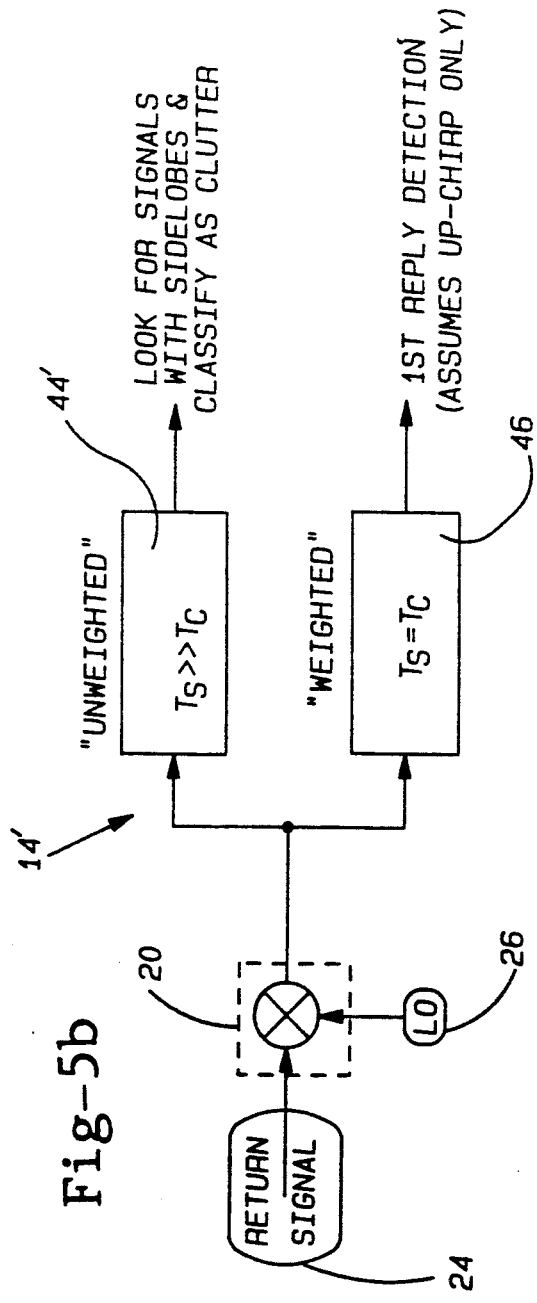
Fig-5a
Fig-5b

LASER RADAR WIRE DETECTION

BACKGROUND OF THE INVENTION

1. Technical Field

The present invention relates to laser radar detection systems and, more particularly, to a laser radar detection system which discriminates between resolved and unresolved targets to detect objects in a cluttered environment.

2. Discussion

There exists a need for a more simplified radar detection system for detecting objects or targets located in a cluttered environment and discriminating between resolved and unresolved detected targets. In particular, there is a need for a simple wire detection system for use with helicopters and other airborne vehicles. Such a system would be desirable to detect a wire or wires such as a transmission line or other cables that are located in a severe clutter environment. Other possible applications may include the detection of another helicopter, airplane or other similar targets or objects located in a cluttered environment.

A wire or cable may be characterized as an unresolved target due to its relatively small size in comparison to the area detected by the radar beam of the detection system. Similarly, an airborne vehicle may be classified as an unresolved target if the area covered by the radar beam is larger than the vehicle. A clutter environment may include trees, buildings or other relatively large objects located near the wire or other unresolved targets. Objects which characterize a clutter environment represent resolved targets due to the relatively large size in comparison to the area detected by the radar beam of the detection system.

Conventional radar systems have not had the resolution capability provided by modern laser systems. The advent of laser radar has made wire detection in a cluttered environment more possible. However, current wire and clutter discrimination techniques have generally required large amounts of processing power, even when used with conventional high resolution imaging laser radar systems. Current detection techniques generally include performing the wire detection process based upon hough transforms and feature detection. Such techniques have performed to some degree, however, the potential for false alarms or missed wires has remained significant. In addition, these current detection systems have usually relied on the image and therefore have generally required several specialized high speed signal processing cards which utilize a large amount of power.

It is therefore desirable to obtain a more simplified radar detection system for detecting objects or targets located within a cluttered environment. In particular, it is desirable to obtain a simple wire detection system for use in airborne vehicles which does not require large amounts of processing power. It is further desirable to obtain such a detection system which is capable of discriminating between resolved and unresolved objects located within the detection field.

SUMMARY OF THE INVENTION

In accordance with the teachings of the present invention, a laser radar detection system is provided which discriminates between unresolved and resolved detected objects. The detection system includes a laser radar sensor for transmitting an optical transmit signal within a desired field and receiving reflected signals from objects located therein. The laser radar sensor includes a photo mixer for providing the difference between the received reflected signals and a local oscillator (LO) signal derived from the transmit signal. The detection system further includes a processor which provides the fourier transform of the laser radar sensor signal output and further determines whether the transformed signal contains side lobes and is therefore clutter or does not contain side lobes and therefore indicates the detection of an unresolved object.

BRIEF DESCRIPTION OF THE DRAWINGS

Other objects and advantages of the present invention will become apparent to those skilled in the art upon reading the following detailed description and upon reference to the drawings, in which:

FIG. 5a is a block diagram which illustrates a single channel processor in accordance with the present invention;

FIG. 5b is a block diagram which illustrates a dual channel processor in accordance with an alternate embodiment of the present invention;

DETAILED DESCRIPTION OF THE PREFERRED EMBODIMENT

Figure 1:
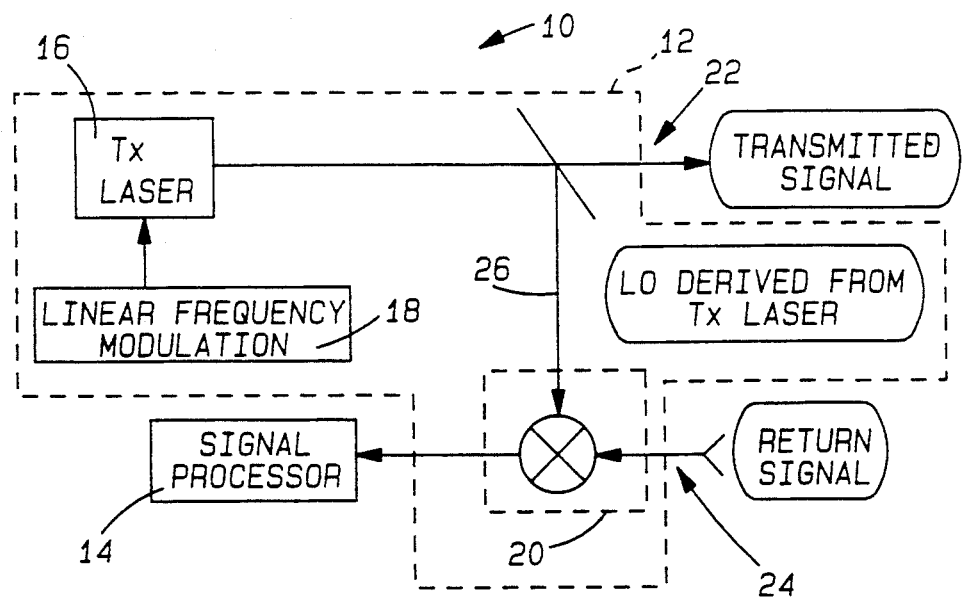
FIG. 1 is a block diagram which illustrates a frequency modulated (FM) laser radar system in accordance with the present invention.

Turning now to FIG. 1, a block diagram for a frequency modulated (FM) laser radar detection system 10 is shown therein in accordance with the present invention. The laser radar detection system 10 employs a frequency modulated (FM) homodyne laser radar sensor 12 and a signal processor 14. The FM modulated laser radar sensor 12 includes a transmit laser 16 for transmitting an optical frequency modulated (FM) transmit signal 22 throughout a desired detection field.

The FM modulated laser radar sensor 12 further includes a photo mixer 20. The photo mixer 20 receives a local oscillator (LO) transmit signal 26 which is derived from the transmit signal 22. The LO transmit signal 26 has the same frequency as the transmit signal 22, with a lower power amplitude that is proportioned therewith. The photo mixer 20 of laser radar sensor 12 further receives a return signal 24. The return signal 24 is the result of the transmit signal 22 being reflected from objects located within the detection field. The photo mixer 20 multiplies the LO transmit signal 26 with the return signal 24 to provide a summation signal and a difference signal as its outputs. For purpose of this invention, the difference signal is advantageously utilized.

The signal processor 14 is connected to the output of the photo mixer 20 for receiving the difference signal provided therefrom. Signal processor 14 is capable of providing fourier analysis and other various mathematical functions, and includes a surface acoustic wave (SAW) analyzer. Such an SAW analyzer may include a spectrum analyzer of the type manufactured by Phonon Corporation having a model number AS25-15-50 or other similar processing devices having similar processing capabilities.

In operation, the FM modulated laser radar sensor 12 transmits a frequency modulated (FM) optical transmit signal 22. The transmit signal 22 is scanned throughout a desired detection field. When objects or targets are located within the detection field the transmit signal 22 is reflected therefrom to produce the return signal 24. The return signal 24 is then received by the laser radar sensor 12 and compared with the LO transmit signal 26 by photo mixer 20. In doing so, the photo mixer 20 multiplies the return signal 24 with the LO transmit signal 26 to produce the difference therebetween as one of its outputs. The resulting difference signal is an intermediate frequency (IF) signal known as the beat frequency which contains range information.

The difference signal is then provided to the signal processor 14 for analysis therein. The signal processor 14 may analyze the difference signal to determine the difference in time between the transmit signal 22 and the return signal 24 by comparing the difference in frequency between the return signal 24 and the LO transmit signal 26. Since the frequency modulation is known, the time elapsed during such a change in frequency may be computed therefrom. The time may then be used to determine the distance from the laser radar detection system 10 to the detected target.

The signal processor 14 transforms the difference signal to the frequency domain using a fourier transform. The fourier transform provides a power spectrum of the signal. The power spectrum will contain an amplitude in the form of either a gaussian or sinc envelope when objects are detected. The sinc envelope contains side lobes whereas the gaussian envelope has no side lobes. The signal processor 14 analyzes the power spectrum to determine whether side lobes are present.

Figure 2A:
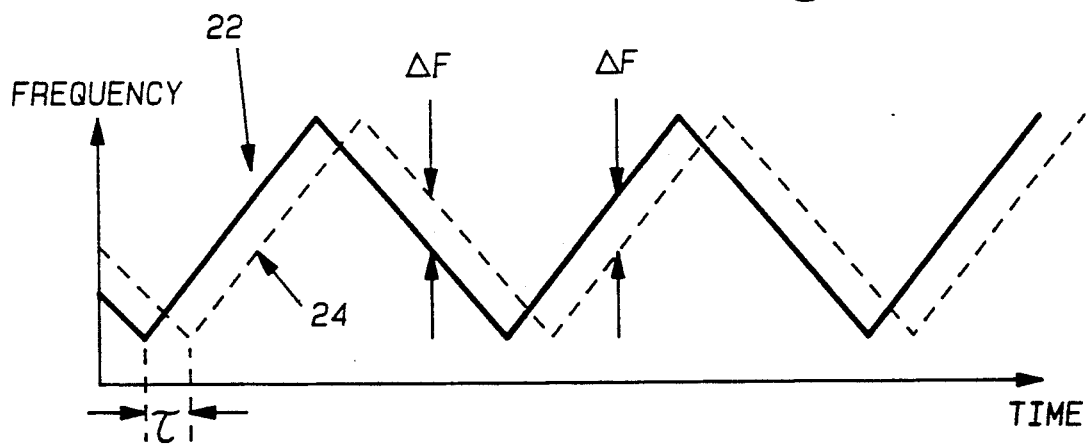
FIG. 2a is a timing diagram which illustrates the frequency modulation for a transmitted and received signal as provided by the laser radar system in FIG. 1.
Figure 2B:
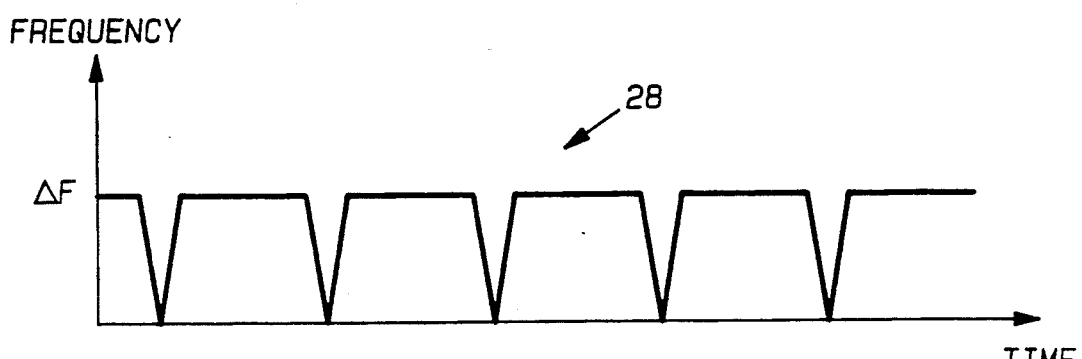
FIG. 2b is a timing diagram which illustrates the output signal from the photo mixer.

FIG. 2a illustrates an example of a transmit signal 22 in comparison with a return signal 24 on a frequency versus time scale. The transmit signal 22 is shown having a frequency modulated triangular-shaped waveform. In contrast, the return signal 24 essentially provides a similar waveform that is displaced in time from the transmit signal 22. The frequency of both the transmit signal 22 and return signal 24 varies due to the frequency modulation of the transmit signal 22 and the time it takes the return signal 24 to be detected. The difference in time between the two signals is essentially the time required for the transmit signal 22 to transmit to a detected object, be reflected therefrom and detected as the return signal 24. FIG. 2b illustrates the difference signal that is provided by the output of the photo mixer 20 on a frequency versus time scale.

Figure 3:
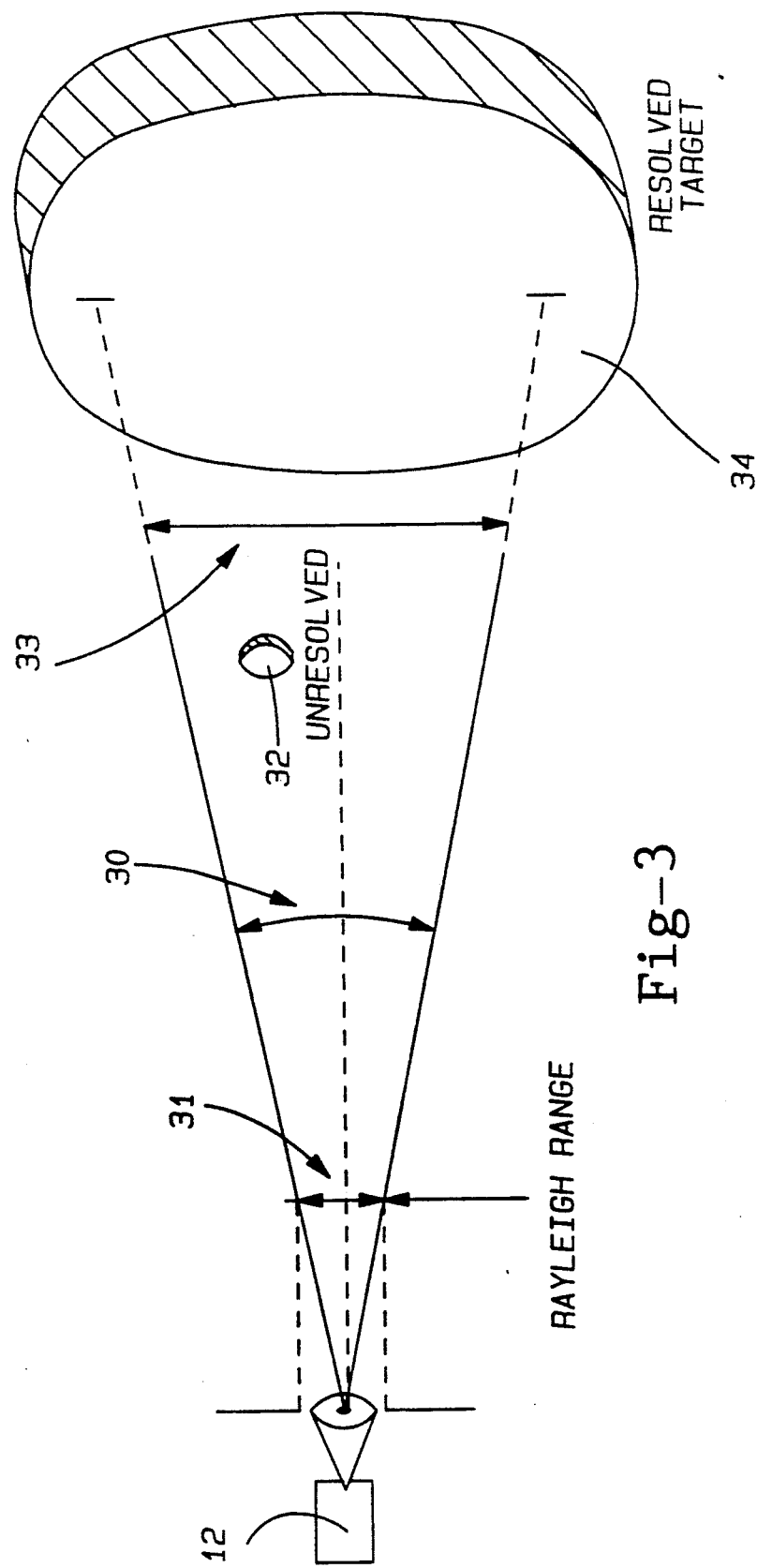
FIG. 3 is a schematic diagram which illustrates the detection of targets with a laser radar sensor in accordance with the present invention.

FIG. 3 illustrates the detection of targets with a laser radar sensor 12. Laser radar sensor 12 transmits an optical laser transmit signal 22 which is scanned throughout a detection field. The transmit signal 22 is transmitted within the bounds of a radar detection beam 30 having a width 33 which varies according to the distance displaced from the laser radar sensor 12. The further the distance from the laser radar sensor 12, the wider the width 33 of the detection beam 30. The detection beam 30 initially maintains a fairly narrow width inside the boundaries of the rayleigh range 31. After reaching the rayleigh range 31, the detection beam 30 further diverges to provide a wider conical shaped beam which is used to detect objects therein.

A relatively small unresolved object 32 is shown within the detection field. The unresolved object 32 is small enough such that the cross-sectional area of the detection beam 30 may fully cover the unresolved object 32. For purposes of this invention it is preferable that such unresolved objects 32 have a width of less than half the width 33 of the beam 30. Such an unresolved target may include a wire or plurality of wires or cables, an airborne vehicle or any number of objects that are smaller than the area covered by the scanning detection beam 30 and have a width of less than half the width 33 of the beam 30.

A resolved target 34 is further shown in FIG. 3. In contrast, the resolved target 34 is larger than the cross-sectional area covered by the detection beam 30 of the laser transmit signal 22. As a result, the transmit signal 22 is not capable of fully covering the resolved target 34. An example of a resolved target 34 may include trees, buildings, the ground or other relatively large objects.

In operation, the transmit signal 22 is continuously scanned throughout the detection field. As the transmit signal 22 is scanned, the time required for the detection beam 30 to travel the distance of its width 33 is known as the coherence time $T_c$. The time required for the detection beam 30 to pass across an unresolved object 32 is approximately equal to or close to the coherence time $T_c$. The time required for the beam 30 to pass across a resolved object will be considerably greater than the coherence time $T_c$. This is because the width of the resolved object is greater than the width of the detection beam 30.

Figure 4A:
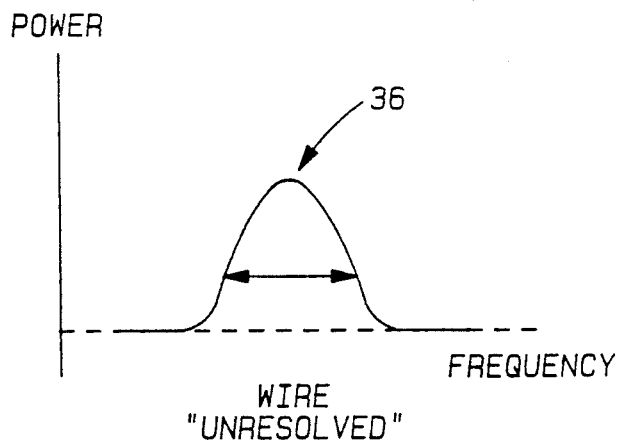
FIG. 4a is a frequency diagram which illustrates the power spectrum for an unresolved target.

This invention advantageously utilizes the frequency characteristics of an unresolved target in comparison to a resolved target to discriminate therebetween. FIG. 4a illustrates the amplitude or power spectrum in the frequency domain for an unresolved target or object. The power spectrum of the unresolved object provides a gaussian envelope 36 centered in the electrical (IF) range. The power spectrum of the unresolved object does not contain side lobes or any amplitude outside of the frequency range of the gaussian envelope 36.

Figure 4B:
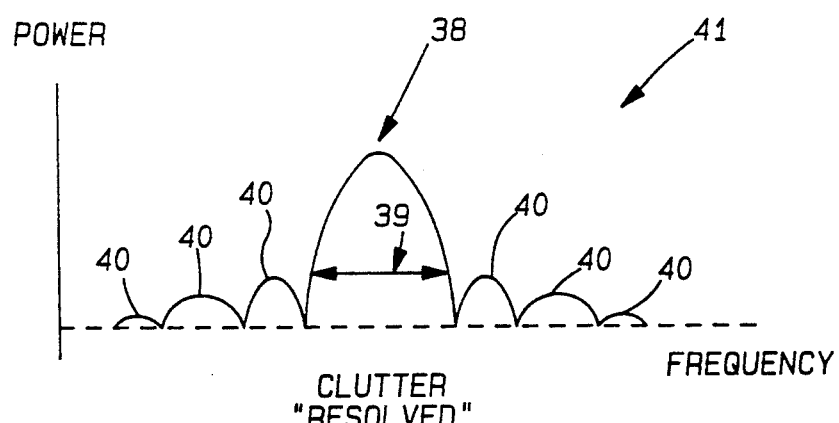
FIG. 4b is a frequency diagram which illustrates the power spectrum for a resolved target.

In comparison, the power spectrum in the frequency domain is shown for a resolved object in FIG. 4b. The power spectrum for a resolved target results in a sinc envelope. The sinc envelope 41 includes a main pulse 38 having an amplitude and a width 39. The sinc envelope 41 further includes side lobes 40 located on the outer sides of the main pulse 38. Each of the side lobes 40 essentially represents an amplitude outside of the frequency range of the main pulse 38. The signal processor 14 receives the difference signal from the output of the photo mixer 20 and provides the power spectrum thereof. Given the characteristics between the gaussian envelope 36 and the sinc envelope 41, the signal processor 14 then analyzes the power spectrum to determine whether each signal is representative of a resolved or unresolved object.

FIG. 5a illustrates a single channel processor 14 that is provided for discriminating between resolved and unresolved detected signals. The single channel processor 14 provides an unweighted fourier transform for transforming the difference signal provided from the output of the photo mixer 20 to a frequency domain. The transformed signal provides power spectrum in the frequency domain. The processor thereafter analyzes the power spectrum to check for side lobes 40. In doing so, the processor 14 measures the pulse width of the main pulse 38 or gaussian envelope 36 of the power spectrum waveform. Using digital signal processing techniques, the processor 14 is capable of discriminating between a power spectrum having side lobes 40 and one that does not. In doing this, the processor 14 samples the power spectrum on both sides of the main pulse 38 or gaussian envelope 36 to detect any power amplitude which would indicate the existence of side lobes 40.

FIG. 5b illustrates a dual channel processor 14' in accordance with an alternate embodiment of the present invention. The dual channel processor 14' includes a first channel 44 having an unweighted fourier transform which functions in like respect with the single channel processor 14 discussed above. The dual channel processor 14' further includes a second channel 46 having a fourier transform that is weighted. The weighted fourier transform provides a fourier transform of the difference signal to obtain a power spectrum thereof. The weighted fourier transform produces a power spectrum of both resolved and unresolved targets without side lobes. The power spectrum produced by the weighted fourier transform is similar to that produced by the unweighted fourier transform with the exception that the power spectrum is weighted via an expansion pulse. Meanwhile, the first channel 44 knows whether the difference signal is representative of a resolved or unresolved object. The second channel 46 is then further capable of the checking for less obvious unresolved targets that may be hidden within the side lobes of the clutter "resolved" target. The dual channel processor 14' is thereby able to detect unresolved objects which are located very close to the clutter environment which would otherwise be difficult to detect and discriminate between.

Figure 6:
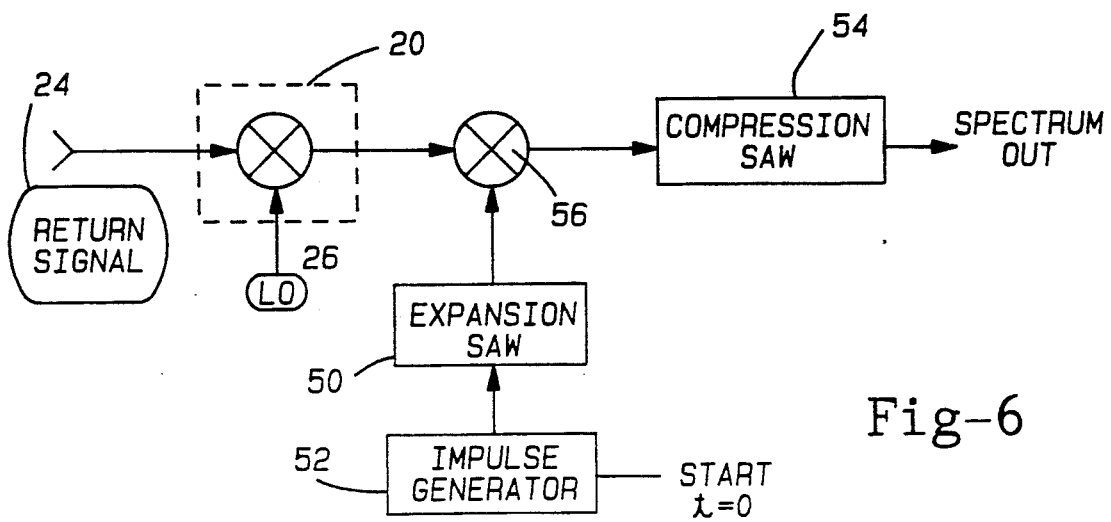
FIG. 6 is a block diagram which illustrates the frequency demodulation and fourier transformation in accordance with the present invention.

FIG. 6 illustrates a typical real time fourier transform signal processor utilizing Surface Acoustic Wave (SAW) devices. An expansion SAW 50 receives an impulse from an impulse generator 52, thus beginning the fourier transform, and provides an expanded pulse. The expanded pulse is either weighted or unweighted depending upon the requirements of the signal processor 14. The expanded pulse is multiplied with the difference signal received from the output of the photo mixer 20 by mixer 56. The resulting signal is then compressed by a compression SAW 54 and provided as the spectrum output therefrom. The time series signal from the compression SAW 54 represents frequency, i.e., the time from the impulse to output of the compression saw 54 is proportional to the difference signal frequency.

The width of the expanded pulse is the sample time $T_s$. The sample time $T_s$ represents the amount of time that series data is being fourier transformed. For the unweighted fourier transform it is preferred that the sample time $T_s$ be much greater than the coherence time $T_c$ of the detection beam 30. However, for the weighted fourier transform it is preferred that the coherence time $T_c$ be equal to or greater than the sample time $T_s$. The significance of $T_s$ is that in conventional spectrum analyzers the sample time $T_s$ is smaller than the coherence time $T_c$ and weighted such that side lobes are minimized or eliminated. In this case, the unresolved target has a natural time weighting and is coherent over the duration of the return signal. Therefore, the power spectrum of a return signal from an unresolved target has no side lobes and has a gaussian envelope regardless of the length of the sample time $T_s$ with respect to the coherence time $T_c$. Therefore, when the sample time Ts becomes much greater than the coherence time $T_c$, the return signals for resolved targets have random phase and amplitudes similar to signals used in spread spectrum communications. This class of signals has power spectrum envelopes that are sinc functions which contain significant side lobes.

Figure 7A:
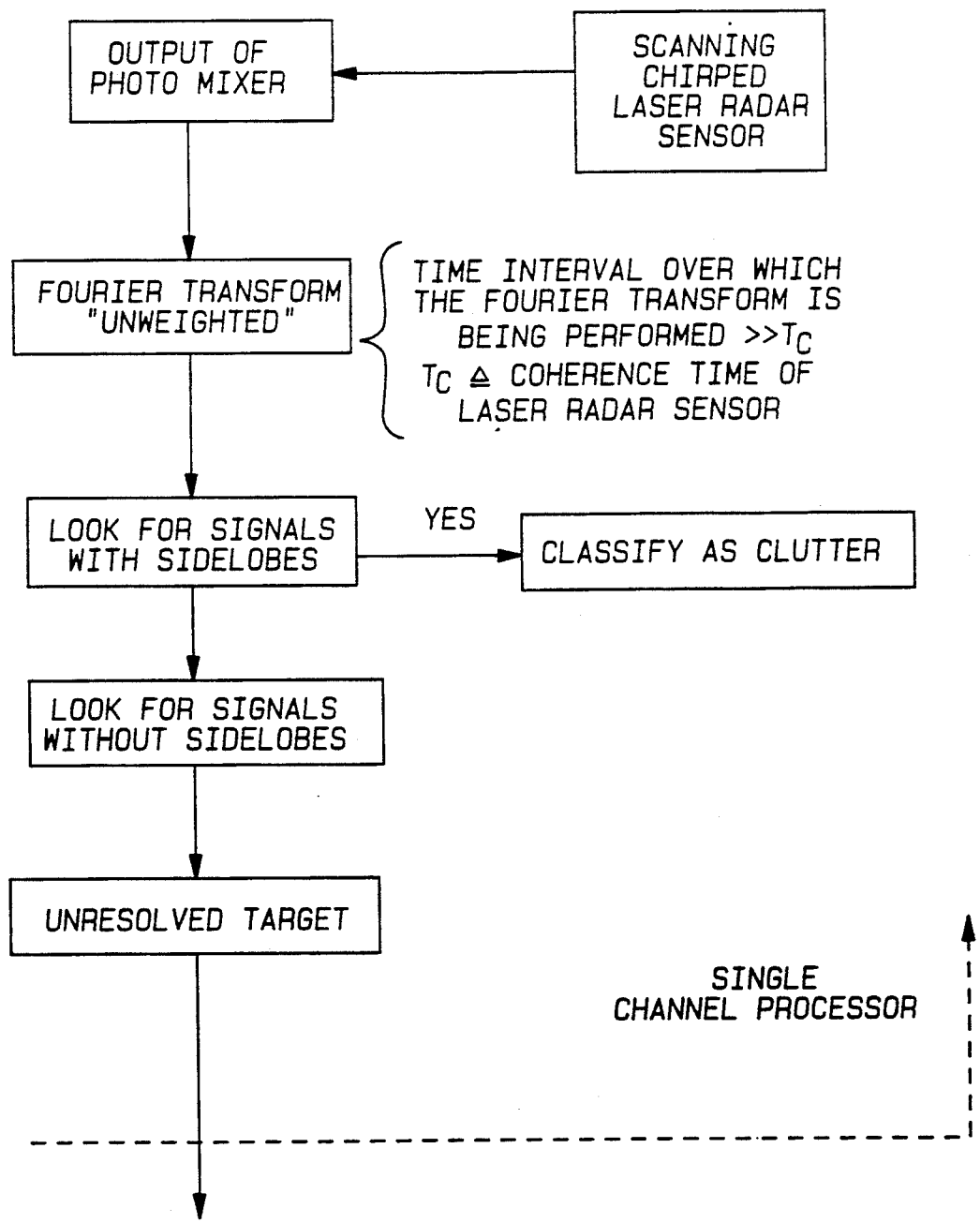
FIG. 7a is a flow diagram which illustrates a processing algorithm for a single channel processor in accordance with the present invention.

FIG. 7a shows a flow diagram which illustrates the operation of the single channel processor 14 in accordance with the present invention. A scanning chirped laser radar sensor 12 provides the transmit signal 22. The photo mixer 20 receives the return signal 24 and the LO transmit signal 26 and provides the difference signal therefrom. An unweighted fourier transform is then calculated by the processor 14 which provides a power spectrum thereof. The processor 14 further employs digital signal processing techniques which search the power spectrum of the signals checking for side lobes located on either side of the main pulse or gaussian envelope. If side lobes are detected by the processor 14, the signal is classified as clutter. If the side lobes are not detected, the signal is classified as an unresolved target.

Figure 7B:
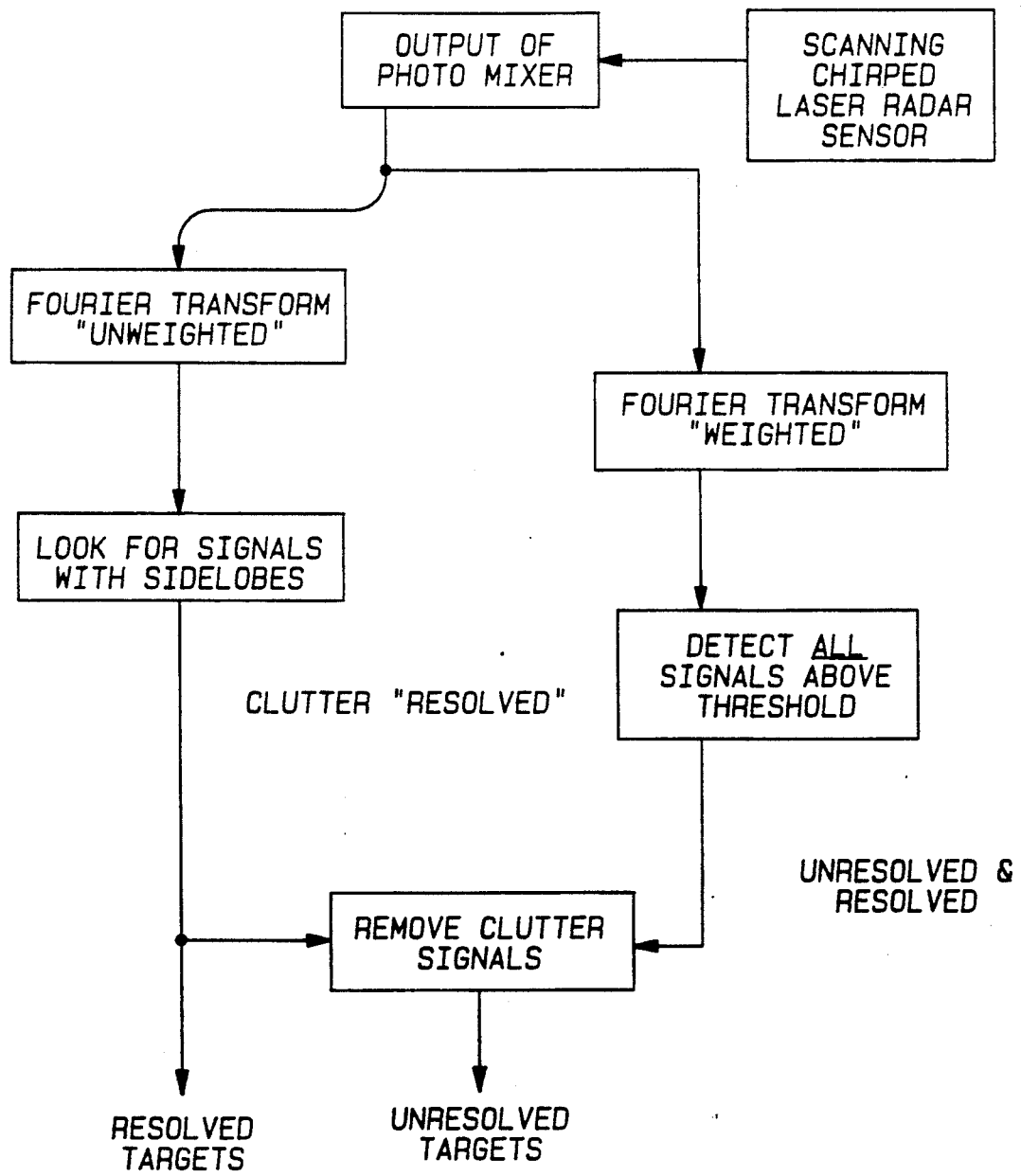
FIG. 7b is a flow diagram which illustrates a processing algorithm for a dual channel processor in accordance with an alternate embodiment of the present invention.

FIG. 7b shows a flow diagram which illustrates the operation of the second channel of the dual channel processor in accordance with an alternate embodiment of the present invention. A scanning chirped laser radar sensor 12 provides the transmit signal 22. The photo mixer 20 receives the return signal 22 and the LO transmit signal 26 and provides the difference signal therefrom. As in the single channel processor 14 the unweighted fourier transform output is used to classify and/or identify all resolved signals by identifying those signals that have a power spectrum envelope that contains significant side lobe levels. The weighted fourier transform detects all signals (both resolved and unresolved). The processor 14' is designed such that neither class of return signals contain side lobes. Therefore, the weighted fourier transform provided by processor 14' has no way of discriminating resolved from unresolved targets. This allows the detection of unresolved targets which are located very close to a resolved target and is hidden in the side lobes of the unweighted processor. The final step is to determine which of the return signals from the weighted processor are unresolved targets by eliminating the resolved targets which are detected by the unweighted fourier transform of processor 14'.

This invention has been described for a single laser radar sensor, however a plurality laser radar sensor may be employed. This may be desirable for purposes of effectively scanning large detection field. The signals from the plurality of laser radar sensors would then be individually analyzed in accordance with the above described invention.

In view of the foregoing, it can be appreciated that the present invention enables the user to achieve a simplified laser radar wire detection system which discriminates between resolved and unresolved targets. Thus, while this invention has been disclosed herein in connection with a particular example thereof, no limitation is intended thereby except as defined by the following claims. This is because the skilled practitioner will recognize that other modifications can be made without departing from the spirit of this invention after studying the specification and drawings.

What is claimed is:

1. A laser radar detection system which discriminates between unresolved and resolved detected objects, said system comprising:
    a laser radar sensor for transmitting an optical scanning transmit signal within a desired field and receiving reflected signals from objects located therein;
    said laser radar sensor including a photo mixer for receiving both said reflected signals and a local oscillator (LO) signal derived from said transmit signal and providing the difference therebetween as an output signal; and
    processing means for receiving the output signal of said photo mixer and discriminating between resolved and unresolved signals detected therein said processing means comprising;
    fourier transform means for providing an unweighted fourier transform of the received signal to thereby provide a power spectrum in the frequency domain; and
    signal processing means for determining whether the power spectrum of said signal contains side lobes representing clutter or does not contain side lobes representing an unresolved object.

2. The system as defined in claim 1 wherein said signal processing means includes:
    measurement means for detecting an amplitude which indicates a gaussian envelope or a main pulse of said power spectrum and measuring the pulse width thereof; and
    detection means for detecting an amplitude representative of side lobes existing on either side of said gaussian envelope or main pulse.

3. The system as defined in claim 2 wherein said fourier transform means comprises:
    an expansion surface acoustic wave (SAW), said expansion SAW receiving an impulse from an impulse generator connected thereto;
    a compression SAW; and
    a mixer for providing the difference between the expansion SAW output and the output of said photo mixer, said mixer output being provided to said compression SAW.

4. The system as defined in claim 2 wherein said transmit signal is transmitted within a beam having a cross-sectional detection area and a width.

5. The system as defined in claim 4 wherein said resolved signals are representative of detected objects having a width that is less than half the width of the beam, said unresolved signals being representative of detected objects having a width larger than the width of said beam.

6. The system as defined in claim 2 wherein said processing means further comprises:
    second fourier transform means for providing a weighted fourier transform of said signal, said second fourier transform means producing a power spectrum without side lobes and further checking for less obvious unresolved targets hidden within the side lobes of the power spectrum for a resolved target.

7. A laser radar detection system which discriminates between unresolved and resolved detected objects, said system comprising:
    a laser radar sensor for transmitting an optical scanning transmit signal within a desired field and receiving reflected signals from objects located therein;
    said laser radar sensor including a photo mixer for receiving both said reflected signals and a local oscillator (LO) signal derived from said transmit signal and providing the difference therebetween as an output; and
    processing means for receiving the output of the photo mixer and discriminating between resolved and unresolved signals detected therein, said processing means including first fourier transform means for providing an unweighted fourier transform of said signal to obtain a power spectrum and signal processing means for determining whether the power spectrum of said signal contains side lobes and is therefore clutter or does not contain side lobes and therefore indicates an unresolved object.

8. The system as defined in claim 7 wherein said signal processing means includes:
    measurement means for detecting an amplitude which indicates a gaussian envelope or a main pulse of said power spectrum and measuring the pulse width thereof; and
    detection means for detecting an amplitude representative of side lobes existing on either side of said gaussian envelope or main pulse.

9. The system as defined in claim 8 wherein said processing means further includes an unweighted surface acoustic wave (SAW) comprising:
    an expansion surface acoustic wave (SAW), said expansion SAW receiving an impulse from an impulse generator connected thereto;
    a compression SAW; and
    a mixer for providing the difference between the expansion SAW output and the output of said photo mixer, said mixer output being applied to said compression SAW.

10. The system as defined in claim 9 wherein said processing means further comprises:
    second fourier transform means for providing a weighted fourier transform of said signal, said second fourier transform means producing a power spectrum without side lobes and further checking for less obvious unresolved targets hidden within the side lobes of the power spectrum for a resolved target.

11. A method for detecting objects within a desired field with a laser radar detection sensor and discriminating between unresolved and resolved objects located therein, said method comprising:
    transmitting an optical laser radar signal and scanning a desired field therewith;
    receiving reflected signals from objects located within the field scanned;
    comparing a local oscillator signal derived from the transmitted radar signal with the reflected signal and providing the difference therebetween as a difference signal;

transforming said difference signal to a frequency domain with an unweighted fourier transform to thereby provide a power spectrum;

determining whether the power spectrum of the detected signal contains side lobes; and discriminating between unresolved and resolved signals, said resolved signals having side lobes located thereon and unresolved signals having essentially no side lobes.

12. The method as defined in claim 11 wherein the step of determining whether the power spectrum contains side lobes further comprises the steps of:

detecting any amplitude which indicates a gaussian envelope or a main pulse of said power spectrum;

measuring the pulse width of said gaussian envelope or said main pulse; and checking for any amplitude outside of said pulse width, said amplitude indicating a side lobe.

13. The method as defined in claim 12 further comprising the steps of:

transforming said difference signal to a power spectrum with a weighted fourier transform;

eliminating any side lobes from said power spectrum; and checking for less obvious unresolved targets hidden within the side lobes of the power spectrum for a resolved target.

* * * * *